(12) United States Patent
Furui

(10) Patent No.: US 10,902,181 B2
(45) Date of Patent: Jan. 26, 2021

(54) PROGRAM CREATION APPARATUS

(71) Applicant: Mitsubishi Electric Corporation, Tokyo (JP)

(72) Inventor: Shimpei Furui, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 0 days.

(21) Appl. No.: 16/461,798

(22) PCT Filed: Jun. 16, 2017

(86) PCT No.: PCT/JP2017/022362
§ 371 (c)(1),
(2) Date: May 17, 2019

(87) PCT Pub. No.: WO2018/229979
PCT Pub. Date: Dec. 20, 2018

(65) Prior Publication Data
US 2019/0361958 A1 Nov. 28, 2019

(51) Int. Cl.
*G06F 40/106* (2020.01)
*G06F 40/177* (2020.01)

(52) U.S. Cl.
CPC .......... *G06F 40/106* (2020.01); *G06F 40/177* (2020.01)

(58) Field of Classification Search
CPC ..................... G06F 17/211; G06F 40/106
See application file for complete search history.

(56) References Cited

U.S. PATENT DOCUMENTS

| 9,122,473 | B2 | 9/2015 | Katsukura et al. | |
| 9,160,854 | B1* | 10/2015 | Daddi | H04M 3/5175 |
| 10,237,405 | B1* | 3/2019 | Neuer, III | H04M 3/5175 |
| 2007/0005266 | A1* | 1/2007 | Blevins | G06Q 50/04 |
| | | | | 702/22 |
| 2014/0039833 | A1* | 2/2014 | Sharpe, Jr. | G05B 23/0229 |
| | | | | 702/183 |

(Continued)

FOREIGN PATENT DOCUMENTS

| CN | 101211171 A | 7/2008 |
| JP | 2003-44277 A | 2/2003 |

(Continued)

OTHER PUBLICATIONS

International Search Report and Written Opinion dated Sep. 19, 2017 for PCT/JP2017/022362 filed on Jun. 16, 2017, 6 pages including Translation of the International Search Report.

(Continued)

*Primary Examiner* — Beau D Spratt
(74) *Attorney, Agent, or Firm* — Xsensus LLP

(57) ABSTRACT

A program creation apparatus includes a device information item acquisition unit that obtains data that vary in value in accordance with operating condition of a control program executed by an industrial controller, an operating condition display unit that displays the operating condition of the control program on the basis of the data, and a display format definition information item retaining unit that retains, for data obtained by the device information item acquisition unit, a display format definition information item used when the operating condition display unit displays the operating condition.

11 Claims, 10 Drawing Sheets

(56) References Cited

U.S. PATENT DOCUMENTS

| | | | | |
|---|---|---|---|---|
| 2015/0193418 A1* | 7/2015 | Koska | ................... | H04L 67/10 |
| | | | | 715/223 |
| 2016/0179359 A1* | 6/2016 | Kodejs | ................ | G06F 3/04817 |
| | | | | 715/763 |
| 2016/0349931 A1* | 12/2016 | Walter | ................... | G06F 3/1454 |
| 2017/0102678 A1* | 4/2017 | Nixon | ................ | G05B 19/4185 |
| 2017/0123397 A1* | 5/2017 | Billi | ....................... | G05B 15/02 |
| 2017/0364236 A1* | 12/2017 | Kurella | ............ | G08B 13/19682 |

FOREIGN PATENT DOCUMENTS

| | | |
|---|---|---|
| JP | 2004-287957 A | 10/2004 |
| JP | 5414911 B2 | 2/2014 |

OTHER PUBLICATIONS

Notice of Reasons for Refusal received for Japanese Patent Application No. 2018-509942 drafted on Mar. 19, 2018, 4 pages including English Translation.

Decision to Grant a Patent received for Japanese Patent Application No. 2018-509942 drafted on Aug. 14, 2018, 4 pages including English Translation.

Office Action dated May 9, 2020 in Chinese Patent Application No. 201780078630.2, 23 pages.

* cited by examiner

FIG.5

| | 51 | 52 | 53 | 54 | 55 |
|---|---|---|---|---|---|
| | ACTIVATE | DEVICE | CONDITION | SPECIFIED VALUE | DISPLAY FORMAT |
| 50 | YES | D0 | ≥ | 100 | BACKGROUND: PINK |
| | YES | | NONE | | BACKGROUND: COLOR, PATTERN |
| | NO | | = | | CHARACTER: COLOR, STYLE |
| | 511 | | <> | | 551 |
| | | | < | | |
| | | | > | | |
| | | | ≤ | | |
| | | | ≥ | | |
| | | | 531 | | |

PROGRAM CREATION APPARATUS

CROSS-REFERENCE TO RELATED APPLICATIONS

The present application is based on PCT filing PCT/JP2017/022362, filed Jun. 16, 2017, the entire contents of which are incorporated herein by reference.

FIELD

The present invention relates to a program creation apparatus that is used to develop control programs.

BACKGROUND

An industrial controller called a programmable logic controller (PLC) is generally used in controlling production equipment of a factory.

A sequence program, a control program that is executed by the industrial controller, is created by means of a program creation apparatus. The sequence program is described mainly using variables, devices, and numerical values.

The "device" as used herein here refers to an area for storing data that is input or output between the programmable logic controller (hereinafter referred to as "PLC") executing the sequence program and a control-target unit connected to the PLC. The device is allocated to a memory address of the PLC. The device allocation is carried out in accordance with the sequence program. In the PLC, device letters are predetermined by data type. For example, a device X is for input data, a device Y is for output data, a device M is for bit type data that is used internally, and a device D is for word type data. The device is represented by the device letter and the address. For example, the input device with an address 0 is represented as "X0".

The program creation apparatus is generally provided as a software tool that operates on a personal computer (hereinafter referred to as "PC"). The program creation apparatus has various functions. For example, the program creation apparatus includes the function of checking the operating condition of the sequence program being executed by the PLC connected to the PC, and transferring, to the PLC, the sequence program edited on the PC, as well as the function of supporting the creation and editing of the sequence program for the PLC to control the production equipment.

The sequence program is a program created for controlling the control-target equipment. To verify whether the created program operates as expected, a user checks and judges values of the devices. The program creation apparatus has the monitoring function with a view to checking the values of the devices. To accommodate the user's different standpoints for the verification, such a monitoring function provides a plurality of checking units, thereby providing an efficient verification environment. These checking units include, for example, a program information display unit to write the values of the devices to the created program, and a device information display unit to display the values of the devices in a list format.

For the purpose of facilitating judgement of the values of the devices, the monitoring function takes approaches for improving the visibility. For example, the display format for the bit-data-type device is changed in accordance with the value of the device, the value being 0 or 1.

In displaying information items on the devices, a conventional monitoring function specifies a display format for the device in accordance with a datatype category such as a bit with the value of 0 or 1 or a word that expresses numerical information and character information. For the devices used in the PLC, the user sets different purposes for the different devices for conducting the programming. In this case, even when identical values are obtained from the devices of the same data type, the values of those devices mean differently. For this reason, in order to judge the current condition of the PLC, the user needs to understand the purpose for using the device, from information such as the comment set for the device and a device identification information item represented by the device letter and the address and judge the displayed value of the device. This means that the conventional monitoring function problematically has difficulty in immediately judging the current operating condition of the sequence program.

With regard to this problem, Patent Literature 1 discloses that screen creation software for a programmable display is used to create a control screen for various components such as a switch, a lamp, a numeric keypad, a meter display, and a graph display. The color of the component displayed on the control screen is changed in response to the change in the value of the corresponding device.

CITATION LIST

Patent Literature

Patent Literature 1: Japanese Patent Application Laid-open No. 2003-44277

SUMMARY

Technical Problems

Unfortunately, the invention described in Patent Literature 1 requires that a user create a monitor screen for checking information items on devices. The creation of the monitor screen involves requires work such as editing of the display screen and the device allocation. Such work is problematic as the work is different from the programming itself. Moreover, when the change occurs in the device such as the change in the purpose of use of the device, and the change in the range of the possible meaningful value of the device, the monitor screen once created needs to be updated.

The present invention has been made in view of the above, and an object of the present invention is to obtain a program creation apparatus that can improve efficiency of control program development.

Solution to Problems

To solve the above problems and to achieve the object, a program creation apparatus according to the present invention comprises: a data acquisition unit to obtain data that vary in value in accordance with an operating condition of a control program executed by an industrial controller; and an operating condition display unit to display the operating condition of the control program on a basis of the data. The apparatus further comprises a display format definition information item retaining unit to retain, for each data obtained by the data acquisition unit, a display format definition information item that is used when the operating condition display unit displays the operating condition.

Advantageous Effect of Invention

The program creation apparatus according to the present invention can improve efficiency of control program development.

BRIEF DESCRIPTION OF DRAWINGS

FIG. 5 illustrates operation of the program creation apparatus for accepting input of the display format definition information item from a user.

DESCRIPTION OF EMBODIMENT

With reference to the drawings, a detailed description is hereinafter provided of a program creation apparatus according to an embodiment of the present invention. It is to be noted that this embodiment is not restrictive of the present invention.

Embodiment

Figure 1:
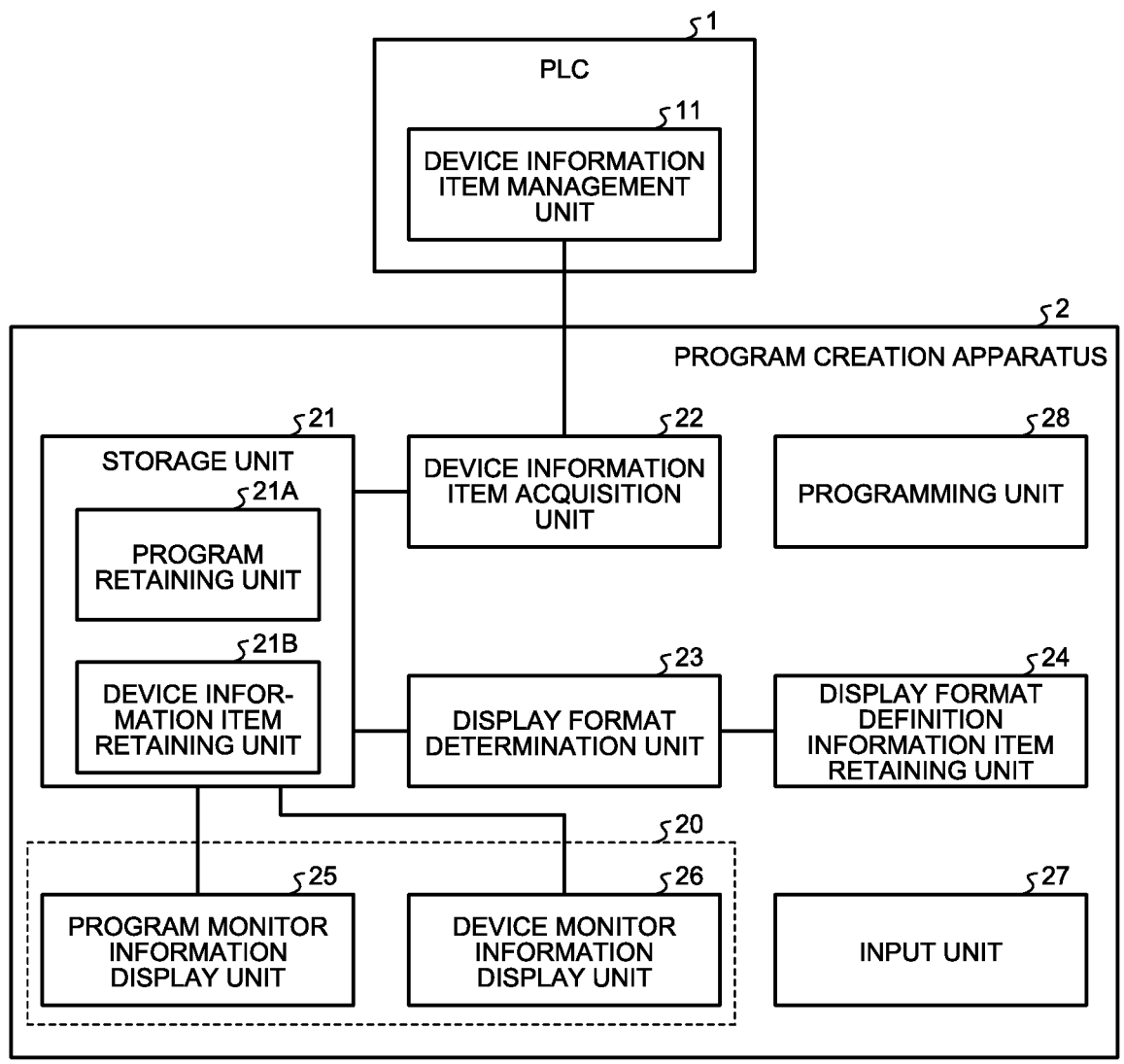
FIG. 1 illustrates a configuration example of a program creation apparatus.

FIG. 1 illustrates a configuration example of the program creation apparatus according to the embodiment of the present invention. The program creation apparatus 2 according to the present embodiment is connectable to a PLC 1 that is an industrial controller. The program creation apparatus 2 includes a function of obtaining information items on devices from the PLC 1 connected to the program creation apparatus 2 and a function of displaying the obtained information items on the devices. The information item on the device includes: information defined by a combination of a device letter and a numeral; and a current value of the device. The device letter represents a type of device, and the numeral represents an address. In the following description, the information item on the device is referred to as "device information item"; the information defined by the combination of the device letter representing the type of device and the number representing the address is referred to as "device identification information item"; and the current value of the device is referred to as "device value". In other words, the device information item is made up of the device identification information item and the device value. The device value is information, which is appropriately updated while the PLC 1 executes a control program, corresponds to data that varies in value in accordance with operating condition of the control program. A user can know the operating condition of the control program by checking the device values.

The program creation apparatus 2 includes a storage unit 21, a device information item acquisition unit 22, a display format determination unit 23, a display format definition information item retaining unit 24, a program monitor information display unit 25, a device monitor information display unit 26, an input unit 27, and a programming unit 28. The storage unit 21 includes a program retaining unit 21A and a device information item retaining unit 21B. It is to be noted that the display format definition information item retaining unit 24 may be included in the storage unit 21. The program monitor information display unit 25 and the device monitor information display unit 26 define an operating condition display unit 20. It is to be noted that the operating condition display unit 20 only has to include at least one of the program monitor information display unit 25 and the device monitor information display unit 26.

The program retaining unit 21A of the storage unit 21 retains a sequence program created by the programming unit 28 that is described later. The sequence program retained by the program retaining unit 21A is the control program that is executed by the PLC 1.

The device information item retaining unit 21B of the storage unit 21 retains the device information items obtained from the PLC 1. The device information items retained by the device information item retaining unit 21B are each the information item on the device included in the sequence program being executed by the PLC 1.

The device information item acquisition unit 22 is a data acquisition unit and obtains, from the PLC 1, the device information items each including the device value that is the data that varies in value in accordance with the operating condition of the control program. In the PLC 1, the device information items are managed by a device information item management unit 11. The device information item acquisition unit 22 obtains all the device information items being managed by the device information item management unit 11 of the PLC 1 and transmits the obtained device information items to the device information item retaining unit 21B.

The display format determination unit 23 determines a display format for each of the device information items retained by the device information item retaining unit 21B. The display format corresponds to, for example, a character color, a font, or a background color for the device information item when the device information item is displayed. It is to be noted, however, that the display format is not limited to these. The display format determination unit 23 determines the display format for the device information item on the basis of a display format definition information item and the device value that is included in the device information item. The display format definition information item is retained by the display format definition information item retaining unit 24.

The display format definition information item retained by the display format definition information item retaining unit 24 indicates a display format that is to be applied when the device information item satisfies a specified condition. A detailed description of the display format definition information item is provided later.

The program monitor information display unit 25 displays the sequence program being executed by the PLC 1, and the device values. The user can know the operating condition of the sequence program by checking the sequence program and the device values that are displayed by the program monitor information display unit 25.

The device monitor information display unit 26 displays the device information items obtained from the PLC 1.

The input unit 27 is formed of a mouse, a keyboard, and others and accepts user operations. The user operation, which is accepted by the input unit 27, is, for example, an operation for creating and editing the sequence program, an operation for inputting the display format definition information item, an operation of providing an instruction to update the device information items retained by the device information item retaining unit 21B, an operation of providing an instruction to display the sequence program and the device values, or an operation of providing an instruction to display the device information items.

The programming unit 28 creates and edits the sequence program in accordance with the user operations accepted via the input unit 27.

With reference to FIGS. 2 to 6, a description is provided next as to operation of the program creation apparatus 2 for obtaining and displaying the device information items from the PLC 1. FIGS. 2 to 6 illustrate the operation of the program creation apparatus 2.

Figure 2:
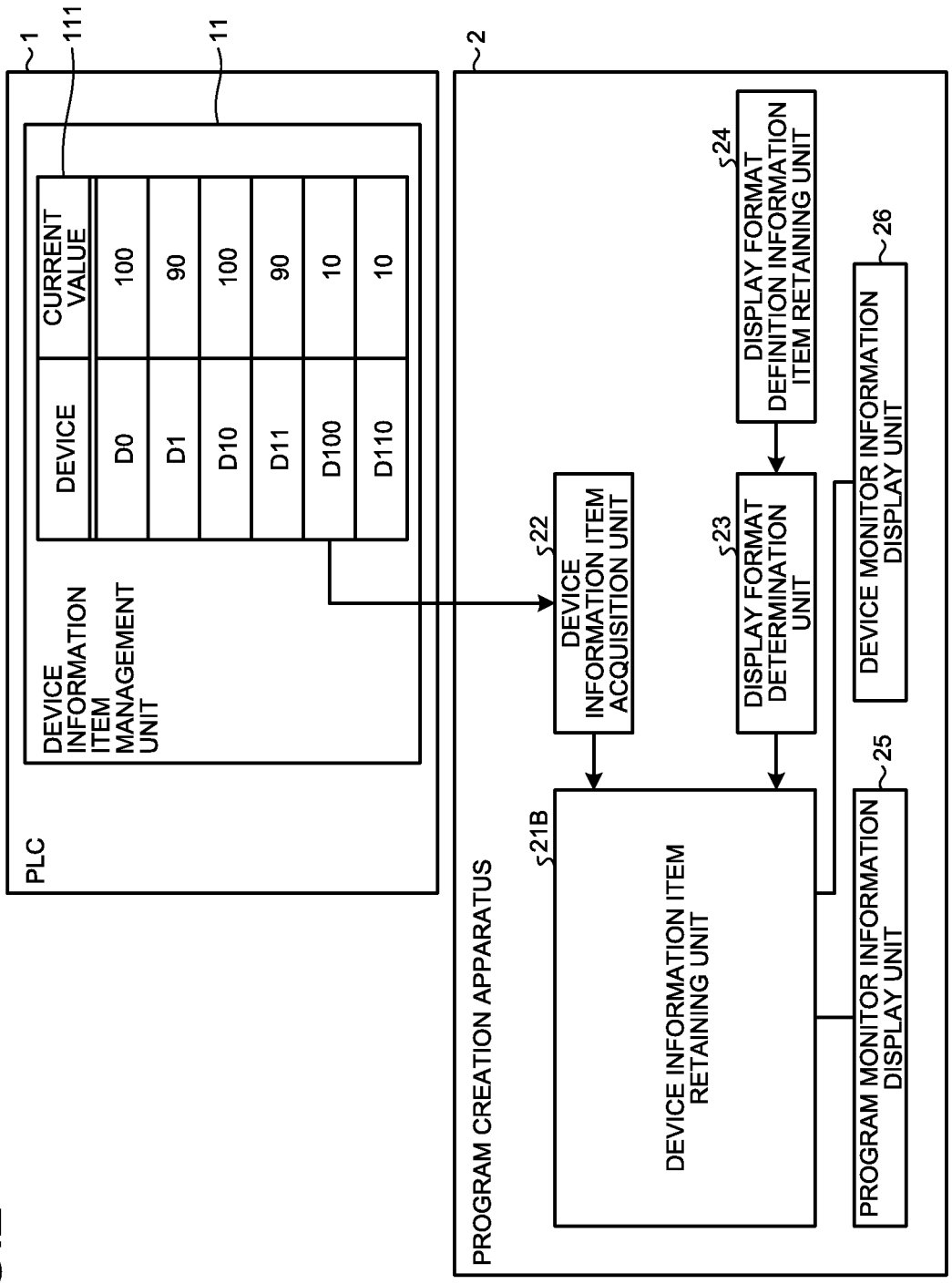
FIG. 2 illustrates a state before the program creation apparatus obtains device information items from a PLC.

FIG. 2 illustrates a state before the program creation apparatus 2 obtains the device information items from the PLC 1. It is to be noted that FIG. 2 illustrates only elements that relate to the operation of obtaining and displaying the device information item, and omits illustration of the other elements. In the state illustrated in FIG. 2, the device information item management unit 11 of the PLC 1 retains a device information item list 111, and the program creation apparatus 2 does not retain the device information items. Registered in a "DEVICE" field of the device information item list 111 is the device identification information item. The current device value is registered in a "CURRENT VALUE" field of the list 111. The device information item list 111 illustrated in FIG. 2 includes: the device information item indicating that the device value corresponding to a device identifier D0 is 100; the device information item indicating that the device value corresponding to a device identifier D1 is 90; the device information item indicating that the device value corresponding to a device identifier D10 is 100; the device information item indicating that the device value corresponding to a device identifier D11 is 90; the device information item indicating that the device value corresponding to a device identifier D100 is 10; and the device information item indicating that the device value corresponding to a device identifier D110 is 10.

Figure 3:
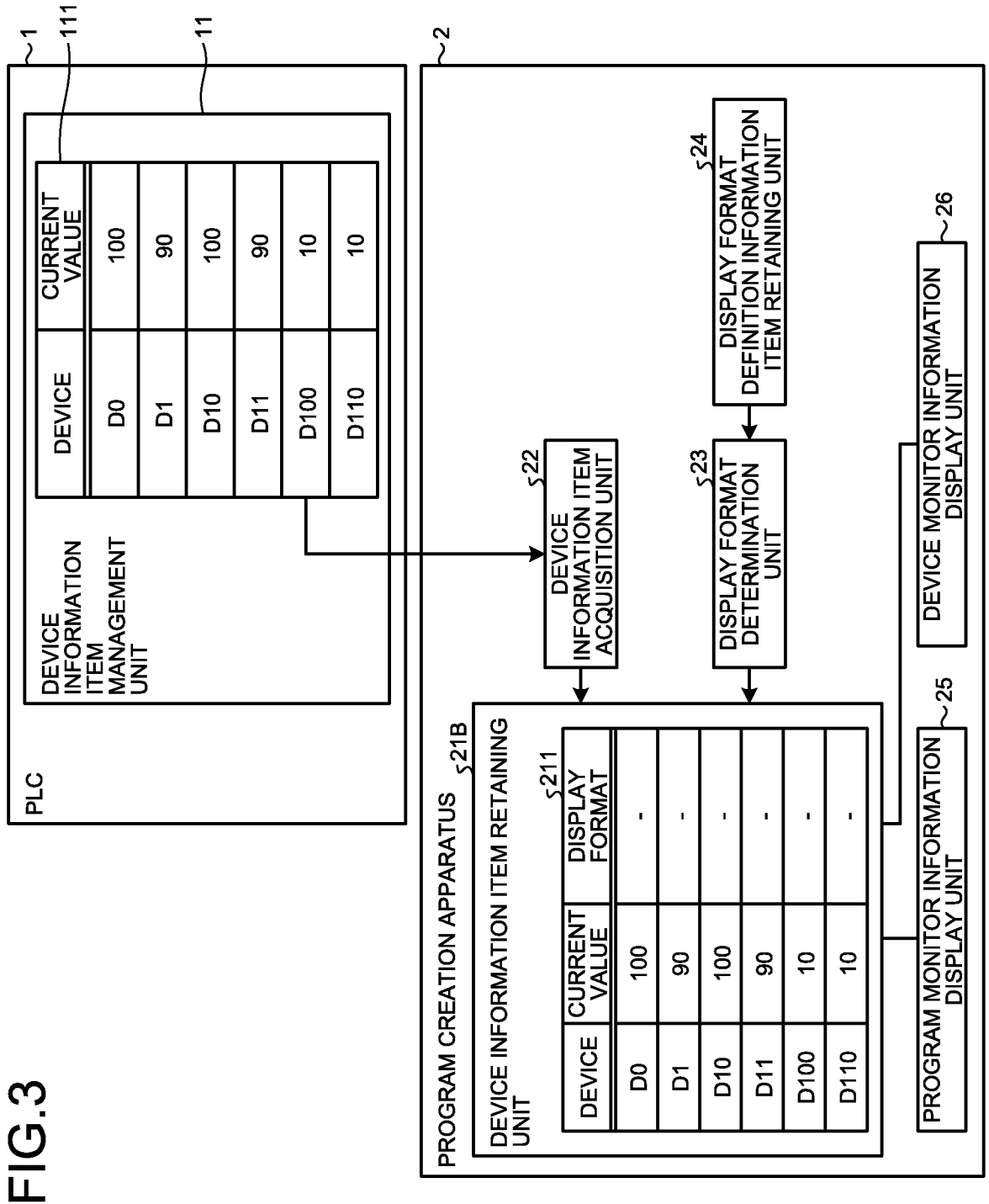
FIG. 3 illustrates a state after the program creation apparatus has obtained the device information items from the PLC.

When the device information item acquisition unit 22 of the program creation apparatus 2 obtains the device information items from the PLC 1, the state illustrated in FIG. 2 changes to a state illustrated in FIG. 3. This means that the device information item retaining unit 21B retains a device information item list 211. FIG. 3 illustrates the state after the program creation apparatus 2 has obtained the device information items from the PLC 1. The device information item list 211 includes "DEVICE" fields, "CURRENT VALUE" fields, and "DISPLAY FORMAT" fields, and a piece of information is registered in each of the fields. The pieces of information registered in the "DEVICE" fields and the "CURRENT VALUE" fields are the same as the pieces of information registered in the "DEVICE" fields and the "CURRENT VALUE" fields of the device information item list 111 retained by the device information item management unit 11 of the PLC 1. No pieces of information piece are registered in the "DISPLAY FORMAT" fields.

Figure 4:
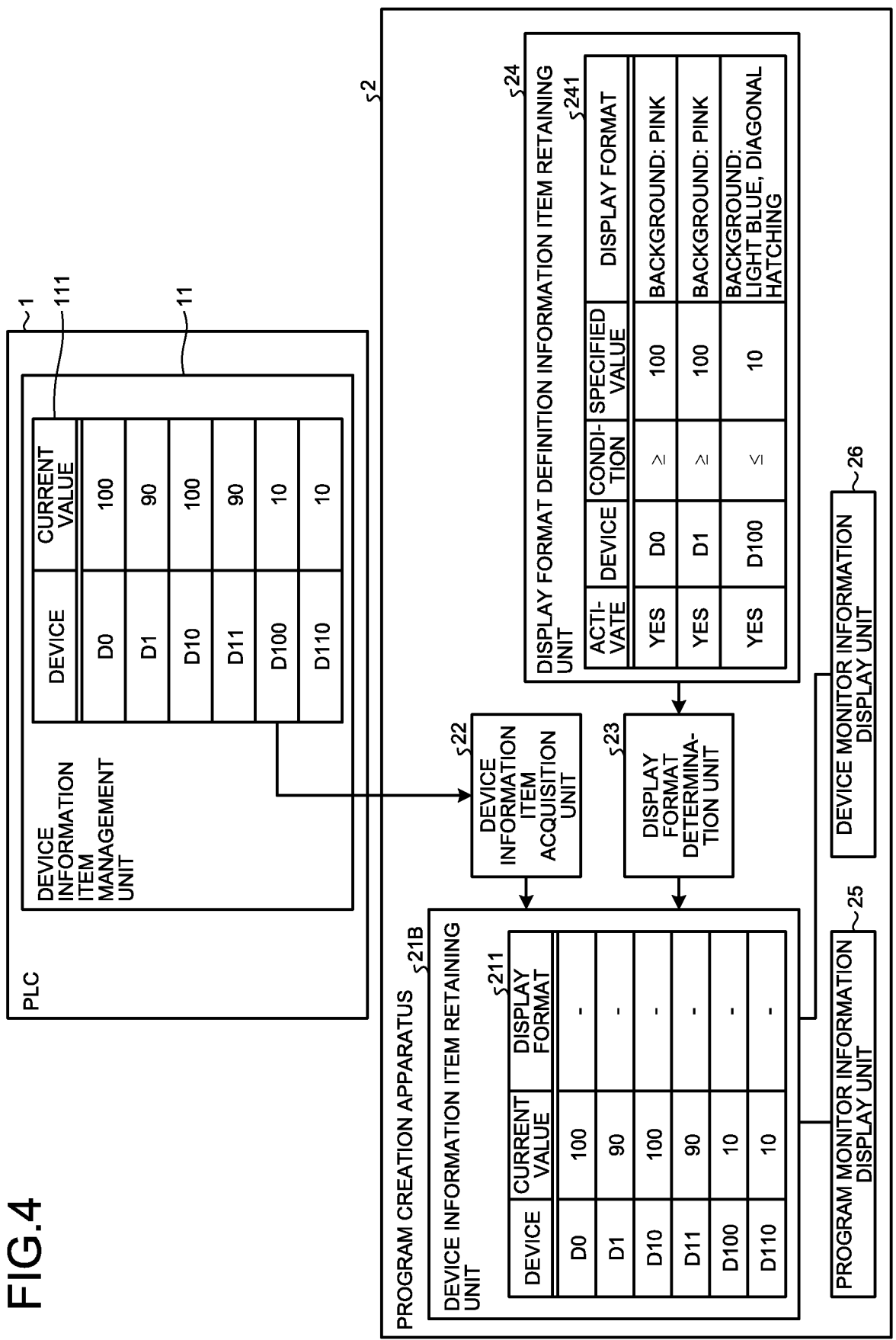
FIG. 4 illustrates a state after the program creation apparatus has accepted input of display format definition information items.

In the state illustrated in FIG. 3, the program creation apparatus 2 accepts, from the user, input of the display format definition information items that are to be retained by the display format definition information item retaining unit 24. This results in a state illustrated by FIG. 4. In other words, the display format definition information item retaining unit 24 retains a display format definition list 241. FIG. 4 illustrates the state after the program creation apparatus 2 has accepted the input of the display format definition information items. The display format definition list 241 includes "ACTIVATE" fields, "DEVICE" fields, "CONDITION" fields, "SPECIFIED VALUE" fields, and "DISPLAY FORMAT" fields. Registered in the "ACTIVATE" field is information indicative of whether to enable a display format change function for the device information item. The device identification information item is registered in the "DEVICE" field. Registered in the "CONDITION" field is information indicative of a condition of comparison between the device value and a specified value registered in the "SPECIFIED VALUE" field. The value registered in the "SPECIFIED VALUE" field is to be compared with the device value. When a relation between the device value and the specified value satisfies the condition of comparison, a condition for changing display format for the device information item is satisfied. For example, the condition corresponding to the device identifier D0 in the display format definition list 241 is "≥" with the specified value being "100". The corresponding "ACTIVATE" field says "YES". In this case, the program creation apparatus 2 changes the display format for the device information item if the device value of the device identifier D0 is equal to or greater than 100. The changed display format provides a pink background color. It is to be noted that in cases where the "ACTIVATE" field corresponding to the device identifier D0 says "NO", the program creation apparatus 2 does not change the display format even if the device value of the device identifier D0 is equal to or greater than 100. In this way, the registered display format can be rendered inapplicable, and partial application is also possible in consideration of display performance.

With reference to FIG. 5, a description is provided here of operation of the program creation apparatus 2 for accepting input of the display format definition information item from the user. FIG. 5 illustrates the operation of the program creation apparatus 2 for accepting the input of the display format definition information item from the user. The program creation apparatus 2 accepts, from the user, information for input into the "ACTIVATE" field 51, the "DEVICE" field 52, the "CONDITION" field 53, the "SPECIFIED VALUE" field 54, and the "DISPLAY FORMAT" field 55 that are illustrated in FIG. 5. With regard to the "ACTIVATE" field 51 and the "CONDITION" field 53, a pull-down menu provides options one of which is to be selected. Options 511 are available for input into the "ACTIVATE" field 51, and options 531 are available for input into the "CONDITION" field 53. In the FIG. 5 example, not inputting any condition of comparison into the "CONDITION" field 53 is also possible. When no condition of comparison is to be input, the user specifies "NONE" from among the options 531. With regard to the "DEVICE" field 52 and the "SPECIFIED VALUE" field 54, for example, numerical values are input directly. With regard to the "DISPLAY FORMAT" field 55, selection is made first using a pull-down menu as to whether to change the display format of a background or characters, and details of the selected display format, such as a color and a font, are specified. Options 551 are available for input into the "DISPLAY FORMAT" field 55. It is to be noted that the FIG. 5 input methods are examples, and other methods may be used. When information is accepted for input into the "ACTIVATE" field 51, the "CONDITION" field 53, the "SPECIFIED VALUE" field 54, and the "DISPLAY FORMAT" field 55, the display format definition information item 50 corresponding to the device identifier D0 is complete. Different conditions and different display formats can be set for the same device, that is to say, the same device identification information item. For example, the program creation apparatus 2 may accept, in addition to the display format definition information item 50 illustrated in FIG. 5, input of another display format definition information item in which the "ACTIVATE" field 51, the "DEVICE" field 52, the "CONDITION" field 53, the "SPECIFIED VALUE" field 54, and the "DISPLAY FORMAT" field 55 indicate "YES", "D0", "≤", "80", and "BACKGROUND: BLUE", respectively. In this case, the program creation apparatus 2 changes the background color for display to pink when the device value of D0 is equal to or greater than 100 and to blue when the device value of D0 is less than or equal to 80.

By repeatedly accepting, from the user, information for input into the "ACTIVATE" field 51, the "DEVICE" field 52, the "CONDITION" field 53, the "SPECIFIED VALUE" field 54, and the "DISPLAY FORMAT" field 55 that are illustrated in FIG. 5, the program creation apparatus 2 creates the display format definition list 241 illustrated in FIG. 4. It is to be noted that the program creation apparatus 2 may create the display format definition list 241 before obtaining the device information items from the PLC 1. In addition, the program creation apparatus 2 does not have to create a display format definition list 241 anew when retaining the previously created display format definition list 241.

In the state illustrated in FIG. 4, the display format determination unit 23 of the program creation apparatus 2 updates, on the basis of the display format definition list 241 retained by the display format definition information item retaining unit 24, the device information item list 211 retained by the device information item retaining unit 21B.

A concrete description is provided of operation of the display format determination unit 23 for updating the device information item list 211. On the basis of the display format definition list 241, first, the display format determination unit 23 identifies, among the device information items included in the device information item list 211, the device information item for which the display format is to be changed. The display format determination unit 23 compares the device value registered on the device information item list 211 with the corresponding specified value in the display format definition list 241. When a relation between the device value and the corresponding specified value satisfies the condition of comparison registered on the display format definition list 241, the display format determination unit 23 determines that the identified device information item qualifies as the one for which the display format is to be changed. The detail registered in an uppermost row of the display format definition list 241 illustrated in FIG. 4 indicates that the background color is to be changed to pink when the device value of D0 is equal to or greater than 100. Meanwhile, the detail registered in an uppermost row of the device information item list 211 illustrated in FIG. 4 indicates that the current device value of D0 is 100. The current device value of D0 satisfies the condition, so that the display format determination unit 23 determines that the device information item qualifies as the one for which the display format is to be changed. The display format determination unit 23 follows the same procedure to compare each of the specified values registered on the display format definition list 241 with the corresponding device value. As a result, the display format determination unit 23 determines that the device information item on the device identifier D1 does not qualify as the device information item for which the display format is to be changed and determines that the device information item on the device identifier D100 qualifies as the device information item for which the display format is to be changed. Next, the display format determination unit 23 registers information on the changed display format in the "DISPLAY FORMAT" field of the device information item included in the device information item list 211. The information on the changed display format is the information registered in the "DISPLAY FORMAT" field of the display format definition list 241 retained by the display format definition information item retaining unit 24. The display format determination unit 23 registers "BACKGROUND: PINK" in the "DISPLAY FORMAT" field corresponding to the device identifier D0 in the device information item list 211, and registers "BACKGROUND: LIGHT BLUE, DIAGONAL HATCHING" in the "DISPLAY FORMAT" field corresponding to the device identifier D100 in the device information item list 211.

Figure 6:
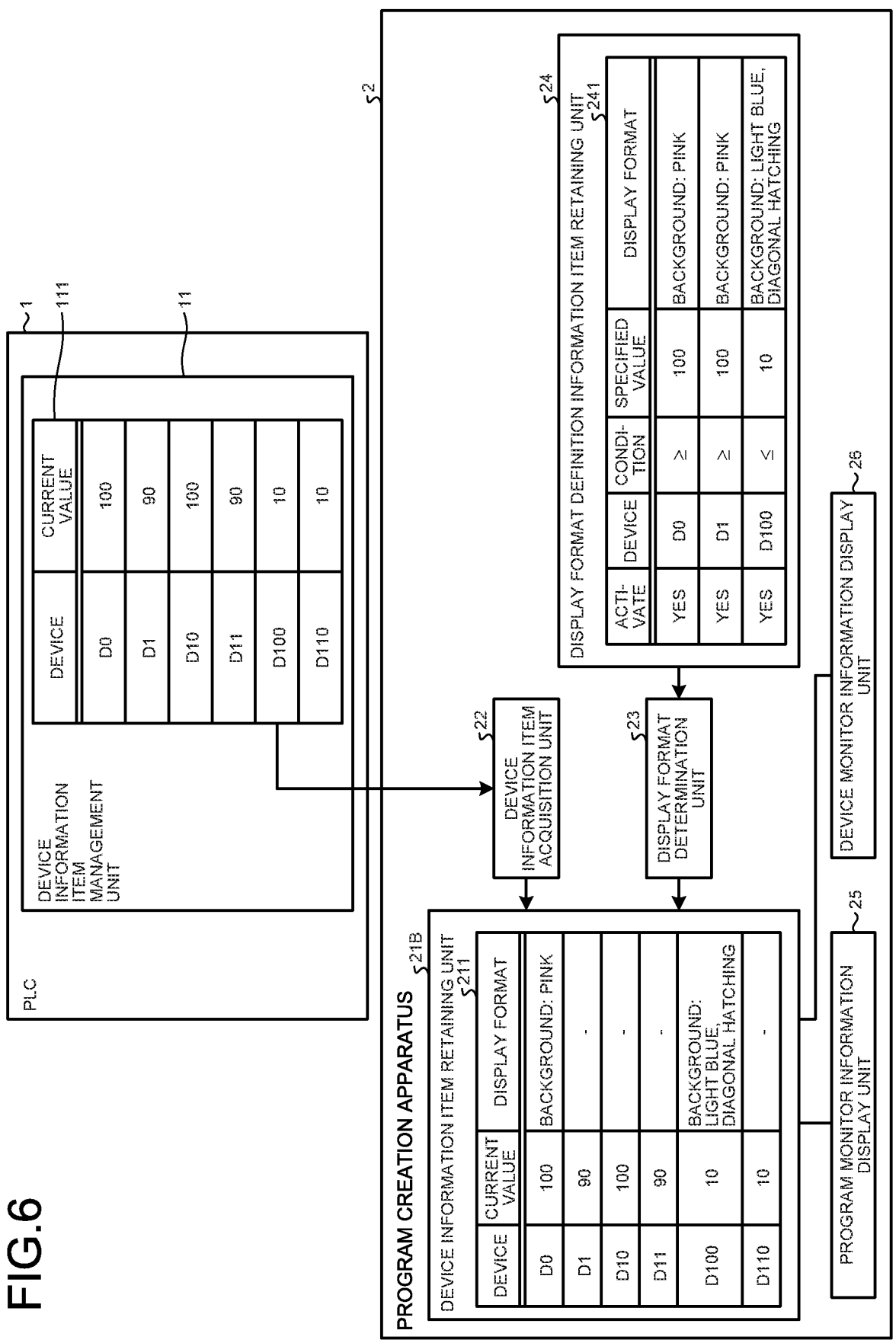
FIG. 6 illustrates a state after the program creation apparatus has updated a device information item list.

The device information item list 211 is updated by the display format determination unit 23, thereby providing a state illustrated in FIG. 6. FIG. 6 illustrates the state after the program creation apparatus 2 has updated the device information item list 211.

Figure 7:
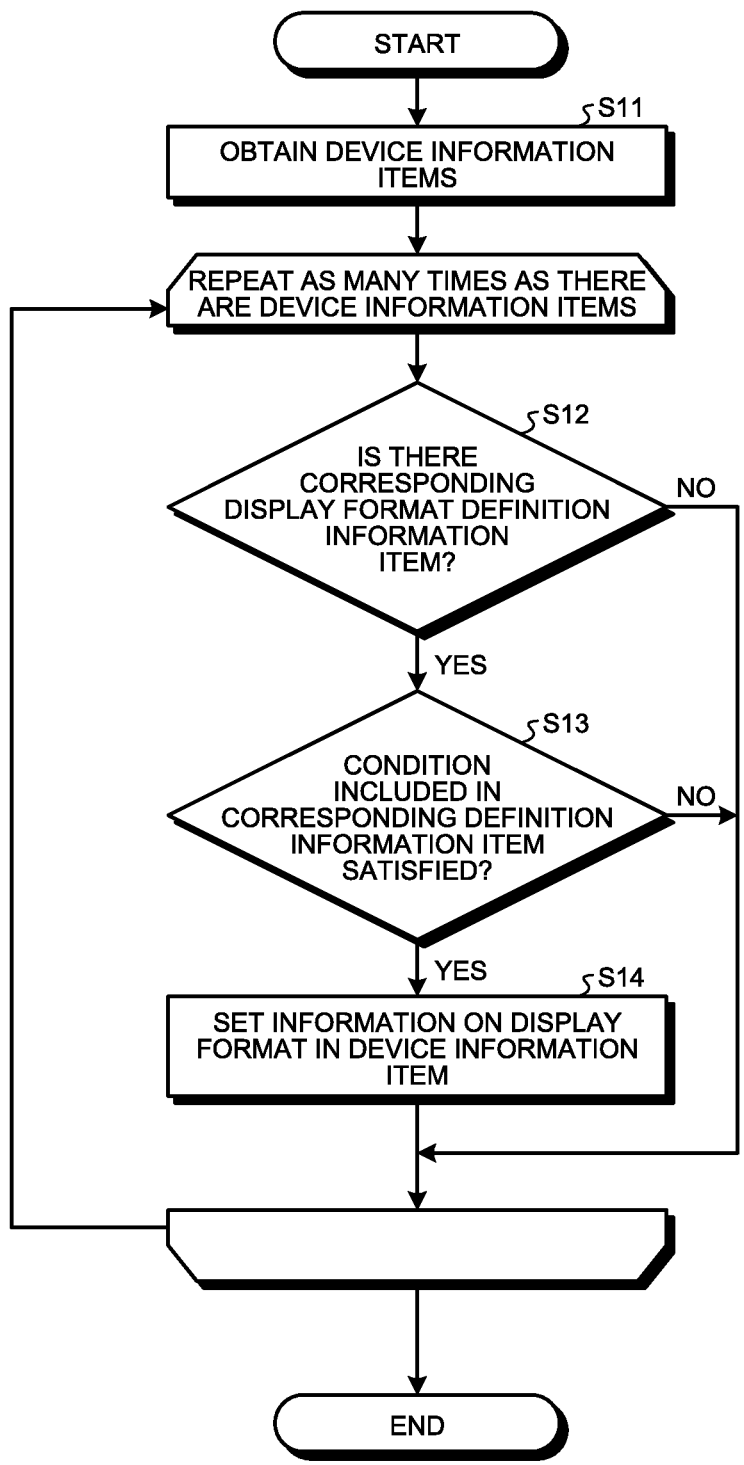
FIG. 7 is a flowchart illustrating an example of operation of the program creation apparatus for updating the device information item list.

The operation described with reference to FIGS. 2 to 6 is represented by a flowchart of FIG. 7. FIG. 7 is a flowchart illustrating an example of the operation of the program creation apparatus 2 for updating the device information item list 211. It is to be noted that the operation illustrated by FIG. 7 refers to a case where the display format definition information item retaining unit 24 retains the display format definition list 241. Upon accepting a user's operation of providing an instruction to update the device information item list 211, the program creation apparatus 2 operates as illustrated in FIG. 7.

Upon accepting the user's operation of providing the instruction to update the device information item list 211, the program creation apparatus 2 first obtains the device information items from the PLC 1 (step S11). Specifically, the device information item acquisition unit 22 obtains, from the device information item management unit 11 of the PLC 1, the device information items registered on the device information item list 111. The device information item acquisition unit 22 also registers the obtained device information items, namely, the device identification information items and the device values on the device information item list 211 retained by the device information item retaining unit 21B.

Next, the program creation apparatus 2 repeats processing from steps S12 to S14 the same number of times as the device information items registered on the device information item list 211 to thereby update the device information item list 211. Steps S12 to S14 are carried out by the display format determination unit 23. In other words, the display format determination unit 23 selects one of the device information items registered on the device information item list 211 and checks whether or not there exists a display format definition information item corresponding to the selected device information item (step S12). Specifically, the display format determination unit 23 compares the selected device information item with each of the display format definition information items retained by the display format definition information item retaining unit 24 to see if there exists the display format definition information item that includes the same device identification information item as the selected device information item among the display format definition information items. For convenience of explanation, the display format definition information item including the same device identification information item as the device information item selected by the display format determination unit 23 is hereinafter referred to as "corresponding definition information item". If no corresponding definition information item exists (step S12: No), the display format determination unit 23 selects one from among unselected device information items registered on the device information item list 211, namely, selects the one that has yet to undergo steps S12 to S14 and carries out steps S12 to S14 for the newly selected device information item. When steps S12 to S14 are carried out for all the device information items registered on the device information item list 211, the display format determination unit 23 ends the operation of updating the information item list 211.

If there exists the corresponding definition information item (step S12: Yes), the display format determination unit 23 checks whether or not the selected device information item satisfies the condition included in the corresponding definition information item (step S13). Specifically, the display format determination unit 23 checks whether or not a relation between the device value included in the selected device information item and the specified value included in the corresponding definition information item satisfies the condition included in the corresponding definition information item. If the selected device information item does not satisfy the condition included in the corresponding definition information item (step S13: No), the display format determination unit 23 selects one from among unselected device information items registered on the device information item list 211 and carries out steps S12 to S14 for the newly selected device information item.

If the selected device information item satisfies the condition included in the corresponding definition information item (step S13: Yes), the display format determination unit 23 sets, in the selected device information item, the information on the display format (step S14). Specifically, the display format determination unit 23 reads the information on the display format from the corresponding definition information item and sets this information in the selected device information item. When, for example, the device information item including the device identifier D0 is selected by the display format determination unit 23 from the device information item list 211 illustrated in FIG. 4, this selected device information item satisfies the condition included in the corresponding definition information item on the display format definition list 241. As such, the display format determination unit 23 reads the information on the display format that says "BACKGROUND: PINK" from the corresponding definition information item and sets the read display format information as the display format for the selected device information item.

When step S14 ends, the display format determination unit 23 selects one from among unselected device information items registered on the device information item list 211 and carries out steps S12 to S14 for the newly selected device information item.

Figures 8, 9:
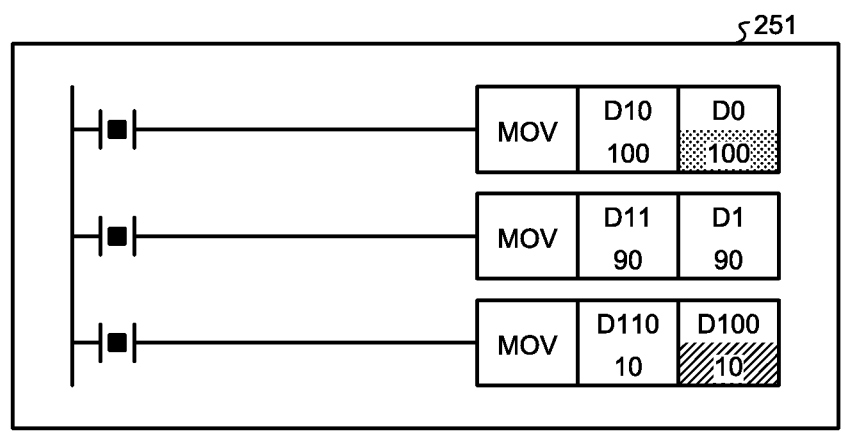
FIG. 8 illustrates an example of a program monitor screen that is displayed by the program creation apparatus.
FIG. 9 illustrates an example of a device monitor screen that is displayed by the program creation apparatus.

When the program monitor information display unit 25 displays a program monitor screen on the basis of the device information item list 211 illustrated in FIG. 6, its details are illustrated in FIG. 8. When the device monitor information display unit 26 displays a device monitor screen on the basis of the device information item list 211 illustrated in FIG. 6, its details are illustrated in FIG. 9.

The program monitor information display unit 25 displays the program monitor screen 251 on which the sequence program and the device values are displayed as illustrated in FIG. 8. In the example illustrated in FIG. 8, the sequence program is displayed in a ladder format but is not limited to this display method. Each of the device values is displayed in the format conforming to the corresponding display format included in the device information item list 211 illustrated in FIG. 6. Since the information on the display format is registered in each of the "DISPLAY FORMAT" fields corresponding to the device identifiers D0 and D100, the program monitor information display unit 25 changes the display formats for the respective device values that correspond to the device identifiers D0 and D100.

Figure 10:
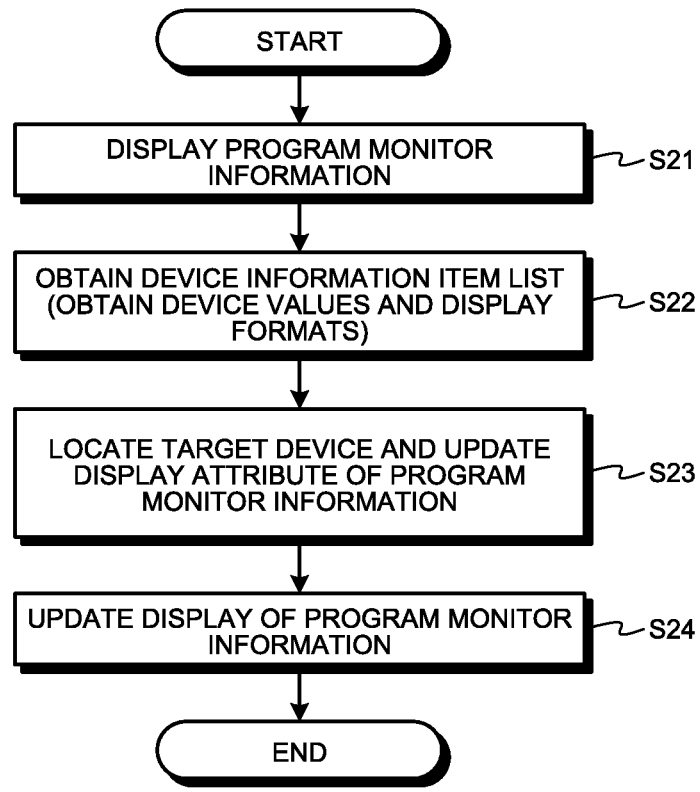
FIG. 10 is a flowchart illustrating an example of operation of a program monitor information display unit.

FIG. 10 is a flowchart illustrating an example of operation of the program monitor information display unit 25. When the program creation apparatus 2 accepts a user's operation of providing an instruction to display the sequence program and the device values as program monitor information, the program monitor information display unit 25 operates as illustrated in FIG. 10. It is to be noted that the program monitor information display unit 25 may operate as illustrated in the FIG. 10, subsequent to the operation illustrated in FIG. 7, namely, the update of the device information item list 211.

When a condition for starting the program monitor information display is satisfied, such as when the operation of providing an instruction to display the program monitor information is accepted, the program monitor information display unit 25 first obtains the sequence program from the program retaining unit 21A and displays program monitor information (step S21). In other words, the program monitor information display unit 25 generates and displays a program monitor screen on the basis of the sequence program obtained from the program retaining unit 21A. Next, the program monitor information display unit 25 obtains the device information item list 211 from the device information item retaining unit 21B (step S22), locates the target devices on the basis of the device information items registered in the obtained device information item list 211 and updates display attributes of the program monitor information (step S23). The target device is a device targeted to have its display attribute updated, and the device corresponding to the device information item that includes the information on the display format qualifies as the target device. When step S23 ends, the program monitor information display unit 25 updates the display of the program monitor information in accordance with the display attributes (step S24). As a result, the program monitor information display unit 25 displays the program monitor screen having the details illustrated in FIG. 8.

The device monitor information display unit 26 displays the device monitor screen 261 on which the device information items are displayed as illustrated in FIG. 9. Each of the device information items is displayed in the format conforming to the display format included in the device information item list 211 illustrated in FIG. 6. Since the information on the display format is registered in each of the "DISPLAY FORMAT" fields corresponding to the device identifiers D0 and D100, the device monitor information display unit 26 changes the display formats for the respective device information items that correspond to the device identifiers D0 and D100.

Figure 11:
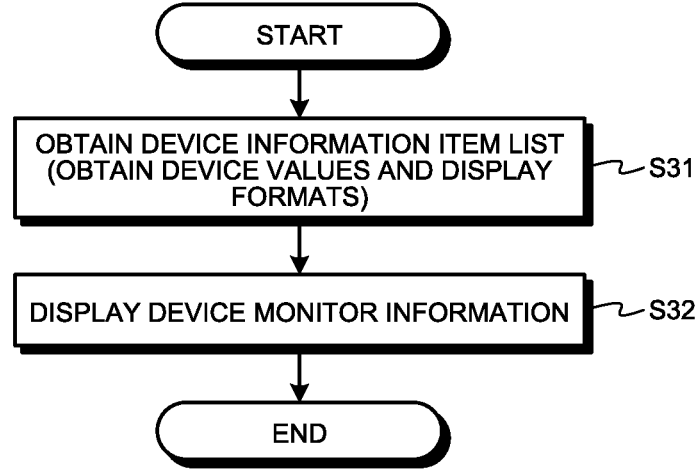
FIG. 11 is a flowchart illustrating an example of operation of a device monitor information display unit.

FIG. 11 is a flowchart illustrating an example of operation of the device monitor information display unit 26. When the program creation apparatus 2 accepts a user's operation of providing an instruction to display the device monitor information, the device monitor information display unit 26 operates as illustrated in FIG. 11. It is to be noted that the device monitor information display unit 26 may operate as illustrated in the FIG. 11, subsequent to the operation illustrated in FIG. 7, namely, the update of the device information item list 211.

When a condition for starting the device monitor information display is satisfied, such as when the operation of providing an instruction to display the device monitor information is accepted, the device monitor information display unit 26 obtains the device information item list 211 from the device information item retaining unit 21B (step S31). Next, the device monitor information display unit 26 displays the device monitor information in accordance with the display format information of each of the device information items included in the device information item list 211 (step S32). In other words, the device monitor information display unit 26 generates and displays the device monitor screen on which each of the device information items is displayed in the format conforming to the display format information of the device information item included in the device information item list 211. Consequently, the device monitor information display unit 26 displays the device monitor screen having the details illustrated in FIG. 9.

The program creation apparatus 2 is configured to be capable of simultaneously displaying the program monitor screen and the device monitor screen. However, it is to be noted that these screens need not always be displayed simultaneously, and only one of these screens may be displayed. The device value for which the information on the display format is not set in the device information item list 211 is displayed in a preset standard display format by the program monitor information display unit 25 and the device monitor information display unit 26.

As described above, the program creation apparatus 2 according to the present embodiment retains the display format definition information item. The display format definition information item includes: the condition for changing the display format for the device value to be displayed, that is to say, the condition for changing the display format change for the device value; and the information on the changed display format. On the basis of the display format definition information item, the program creation apparatus 2 displays the device value obtained from the PLC 1. The display format definition information item is obtained from the user. As such, the device value satisfying the specified condition can be displayed in the format different from the format used for display of other device values. This means that a sequence program developer can check the device values efficiently and thus can easily understand the operating condition of the sequence program. Consequently, efficiency of sequence program development is improved. In the program creation apparatus 2, the program monitor information display unit 25 and the device monitor information display unit 26 can make a common display format change for the identified device, thereby significantly improving visibility of the sequence program. Even when editing of the sequence program is carried out hereafter involving shifting the devices in the program as well as on a device monitor, the device values can be displayed continuously without correction to the program monitor information display unit 25 and the device monitor information display unit 26. The display formats for the respective devices can be specified individually, so that the user can easily distinguish the devices that are used for different purposes. The change to display format in accordance with the device value enables the user to visually grasp the operating condition of the PLC 1. In other words, it becomes easy for the user to grasp the operating condition of the PLC 1, so that a debugging environment improves.

Figure 12:
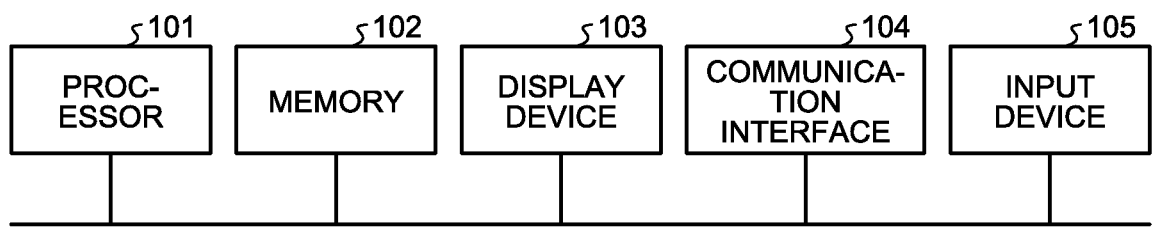
FIG. 12 illustrates an example of a hardware configuration that implements the program creation apparatus.

A description is provided next of a hardware configuration that implements the program creation apparatus 2. FIG. 12 illustrates an example of the hardware configuration implementing the program creation apparatus 2. The program creation apparatus 2 is implemented by a processor 101, a memory 102, a display device 103, a communication interface 104, and an input device 105.

The processor 101 is, for example, a central processing unit (CPU) that is also referred to as a processing unit, an arithmetic unit, a microprocessor, a microcomputer, a processor, or a digital signal processor (DSP). The memory 102 is, for example, a magnetic disk or a nonvolatile or volatile semiconductor memory such as a random-access memory (RAM), a read-only memory (ROM), or a flash memory. The memory 102 retains programs for the processor 101 to operate as the program creation apparatus 2. The memory 102 is also used as a work memory when the processor 101 carries out the various kinds of processing. In addition, the memory 102 is the storage unit 21 and the display format definition information item retaining unit 24.

The input device 105, which is the input unit 27 illustrated in FIG. 1, is, for example, the mouse, the keyboard, or a touch panel. The display device 103 is, for example, a liquid crystal display or a display and displays various screens such as the program monitor screen illustrated in FIG. 8 and the device monitor screen illustrated in FIG. 9. The communication interface 104 is, for example, a network interface card and is used when the program creation apparatus 2 communicates with the PLC 1.

In cases where the processor 101 and the memory 102 that are illustrated in FIG. 12 are used to implement the device information item acquisition unit 22, the display format determination unit 23, the program monitor information display unit 25, the device monitor information display unit 26, and the programming unit 28 of the program creation apparatus 2, the programs for implementing each of functions of these units are stored in the memory 102 and are read and executed by the processor 101. In order for the program monitor information display unit 25 and the device monitor information display unit 26 to be implemented, the display device 103 is also used.

The above configurations illustrated in the embodiment are illustrative of contents of the present invention, can be combined with other techniques that are publicly known and can be partly omitted or changed without departing from the gist of the present invention.

REFERENCE SIGNS LIST 1 programmable logic controller (PLC); 2 program creation apparatus; 11 device information item management unit; 20 operating condition display unit; 21 storage unit; 21A program retaining unit; 21B device information item retaining unit; 22 device information item acquisition unit; 23 display format determination unit; 24 display format definition information item retaining unit; 25 program monitor information display unit; 26 device monitor information display unit; 27 input unit; 28 programming unit; 50 display format definition information item; 111, 211 device information item list; 241 display format definition list.

The invention claimed is:

1. A program creation apparatus comprising:
   data acquisition circuitry to obtain data that vary in value in accordance with an operating condition of a control program executed by an industrial controller, the control program including at least one variable corresponding to the data that vary in value;
   a display to display the control program and the operating condition of the control program on a basis of the data; and
   display format definition information item retaining circuitry to retain, for each data obtained by the data acquisition circuitry, a display format definition information item that is used when the display displays the operating condition,
   wherein when the data satisfies a condition indicated by the display format definition information item, the operating condition is displayed in a format by the display, the format being indicated by the display format definition information item and different from a format that is used when the data does not satisfy the condition indicated by the display format definition information item, and
   wherein the display displays a plurality of devices and the at least one variable associated with at least one of the plurality of devices and the corresponding data that vary in value within the displayed control program.

2. The program creation apparatus according to claim 1, wherein the display displays a screen representing the operating condition, the screen being a screen including display of the data, the display displaying, in a predetermined format, data that does not satisfy a condition indicated by the display format definition information item, the display displaying data that satisfies the condition, in a format indicated by the display format definition information item.

3. The program creation apparatus according to claim 1, wherein the display displays a list of the data.

4. The program creation apparatus according to claim 2, wherein the display displays a list of the data.

5. The program creation apparatus according to claim 1, wherein the display format definition information item includes a plurality of fields, the plurality of fields includes at least two of an active field indicating whether to enable the corresponding display format definition information item, a device field indicating corresponding device identification information, a condition field indicating an operator for evaluating the condition, a specified value field indicating a value for evaluating the condition based on the corresponding data, and a display format field indicating a display format to be displayed when the condition is satisfied.

6. The program creation apparatus according to claim 1, further comprising an input circuit for accepting values for each of a plurality of fields in the display format definition information item, the plurality of fields including a condition field indicating an operator for evaluating the condition, the input circuit configured to select, as the operator, one of an equivalence operator, a non-equivalence operator, a less-than operator, a greater-than operator, a greater-than-or-equal-to operator, a less-than-or-equal-to operator, and a no-condition operator.

7. The program creation apparatus according to claim 1, wherein the data obtained by the data acquisition circuitry includes a value of information that is input or output between the industrial controller and a device connected to the industrial controller.

8. The program creation apparatus according to claim 1, further comprising an input circuit for accepting values for each of a plurality of fields in the display format definition information item, the plurality of fields including a device field indicating corresponding device identification information.

9. The program creation apparatus according to claim 1, wherein the display displays the control program with the data displayed within the displayed control program for the at least one variable within the control program according to a display format definition information item that corresponds to the variable.

10. The program creation apparatus according to claim 1, wherein the display displays the control program in a ladder format including the data displayed within the control program in the ladder format according to a corresponding display format definition information item.

11. A method of operating a program creation apparatus comprising:
   obtaining, from data acquisition circuitry, data that vary in value in accordance with an operating condition of a control program executed by an industrial controller, the control program including at least one variable corresponding to the data that vary in value;
   displaying, on a display, the control program and the operating condition of the control program on a basis of the data;
   retaining, in display format definition information item retaining circuitry, for each data obtained by the data acquisition circuitry, a display format definition information item that is used when the display displays the operating condition;
   determining when the data satisfies a condition indicated by the display format definition information item;
   displaying the operating condition in a format by the display when the data is determined to satisfy the condition, the format being indicated by the display format definition information item and different from a format that is used when the data does not satisfy the condition indicated by the display format definition information item; and
   displaying a plurality of devices and the at least one variable associated with at least one of the plurality of devices and the corresponding data that vary in value within the displayed control program.

* * * * *